US011860960B1

(12) United States Patent
Ling et al.

(10) Patent No.: US 11,860,960 B1
(45) Date of Patent: Jan. 2, 2024

(54) METHODS FOR DYNAMIC CONTEXTUALIZATION OF THIRD-PARTY DATA IN A WEB BROWSER, AND RELATED SYSTEMS AND APPARATUS

(71) Applicant: Entelo, Inc., San Francisco, CA (US)

(72) Inventors: Chin Keong Ling, Walnut Creek, CA (US); Ryan Booth, San Francisco, CA (US); Max Schultz, San Francisco, CA (US); Haroon Rasheed Paul Mohamed, Sunnyvale, CA (US); Yangxu Mao, Berkeley, CA (US); Gaurav Kataria, Palo Alto, CA (US)

(73) Assignee: Entelo, Inc., Chicago, IL (US)

( * ) Notice: Subject to any disclaimer, the term of this patent is extended or adjusted under 35 U.S.C. 154(b) by 243 days.

(21) Appl. No.: 16/384,851

(22) Filed: Apr. 15, 2019

Related U.S. Application Data

(63) Continuation-in-part of application No. 16/383,585, filed on Apr. 13, 2019, now abandoned.
(Continued)

(51) Int. Cl.
*G06F 16/9535* (2019.01)
*G06F 16/9538* (2019.01)
(Continued)

(52) U.S. Cl.
CPC ........ *G06F 16/9535* (2019.01); *G06F 3/0484* (2013.01); *G06F 9/451* (2018.02);
(Continued)

(58) Field of Classification Search
CPC .. G06F 16/9535; G06F 16/9538; G06F 9/451; G06F 3/0484; G06N 5/02; G06Q 10/1053
See application file for complete search history.

(56) References Cited

U.S. PATENT DOCUMENTS 6,691,122 B1 2/2004 Witte et al.
6,728,695 B1 4/2004 Pathria et al.
(Continued)

FOREIGN PATENT DOCUMENTS

WO WO-2013165923 A1 11/2013
WO WO-2017117201 A1 7/2017

OTHER PUBLICATIONS

U.S. Appl. No. 16/149,693, filed Oct. 2, 2018, Ling et al.
(Continued)

*Primary Examiner* — Irete F Ehichioya
*Assistant Examiner* — Xiaoqin Hu
(74) *Attorney, Agent, or Firm* — McDermott Will & Emery LLP

(57) ABSTRACT

A computer-implemented method may include: providing an extension for a web browser, the extension having a user interface configured to occupy a portion of a user interface associated with the web browser; intercepting content fetched by the web browser for a web page being a company page, a social media page, or a professional page; processing the fetched content for the web page to extract information including: a company name, a candidate name, a job title, and/or an industry name; querying a database for contextual information based on the extracted information, the contextual information being a summary of information obtained from one or more sources other than the web page; and presenting, via the user interface, the contextual information including: company information based on the company name, candidate information based on the candidate name, job title information based on the job title, and/or industry information based on the industry name.

23 Claims, 6 Drawing Sheets

Related U.S. Application Data

(60) Provisional application No. 62/657,836, filed on Apr. 15, 2018, provisional application No. 62/657,863, filed on Apr. 15, 2018, provisional application No. 62/657,830, filed on Apr. 15, 2018, provisional application No. 62/657,862, filed on Apr. 15, 2018.

(51) Int. Cl.
  *G06Q 10/1053* (2023.01)
  *G06F 3/0484* (2022.01)
  *G06N 5/02* (2023.01)
  *G06F 9/451* (2018.01)

(52) U.S. Cl.
  CPC ........... *G06F 16/9538* (2019.01); *G06N 5/02* (2013.01); *G06Q 10/1053* (2013.01)

(56) References Cited

U.S. PATENT DOCUMENTS

| | | | |
|---|---|---|---|
| 8,285,719 | B1 | 10/2012 | Long et al. |
| 8,719,179 | B2 | 5/2014 | Bonmassar et al. |
| 9,342,592 | B2 | 5/2016 | Giverts et al. |
| 9,665,641 | B1 | 5/2017 | Zhang |
| 9,734,207 | B2 | 8/2017 | Goeppinger et al. |
| 11,030,554 | B2 | 6/2021 | Polli et al. |
| 2002/0073079 | A1 | 6/2002 | Terheggen |
| 2002/0143573 | A1 | 10/2002 | Bryce et al. |
| 2004/0034652 | A1 | 2/2004 | Hofmann et al. |
| 2005/0187802 | A1 | 8/2005 | Koeppel |
| 2006/0070012 | A1* | 3/2006 | Milener ............... G06F 3/0482 715/822 |
| 2006/0116894 | A1 | 6/2006 | DiMarco |
| 2007/0027859 | A1 | 2/2007 | Harney et al. |
| 2007/0198480 | A1 | 8/2007 | Hogue et al. |
| 2009/0164641 | A1 | 6/2009 | Rogers et al. |
| 2009/0182733 | A1 | 7/2009 | Itoh |
| 2009/0248685 | A1 | 10/2009 | Pasqualoni et al. |
| 2009/0327013 | A1 | 12/2009 | McGovern et al. |
| 2010/0114663 | A1 | 5/2010 | Casas et al. |
| 2010/0174713 | A1* | 7/2010 | Baessler ............. G06F 16/9577 707/736 |
| 2010/0241635 | A1 | 9/2010 | Derosear et al. |
| 2010/0287111 | A1 | 11/2010 | Scarborough et al. |
| 2011/0022530 | A1 | 1/2011 | Bogle et al. |
| 2011/0040764 | A1 | 2/2011 | Duchon et al. |
| 2011/0125770 | A1 | 5/2011 | Battestini et al. |
| 2011/0137816 | A1 | 6/2011 | Kornblum et al. |
| 2011/0196802 | A1 | 8/2011 | Ellis et al. |
| 2011/0225048 | A1 | 9/2011 | Nair |
| 2011/0238591 | A1 | 9/2011 | Kerr et al. |
| 2011/0307303 | A1 | 12/2011 | Dutta et al. |
| 2012/0072500 | A1 | 3/2012 | Greene et al. |
| 2012/0095931 | A1 | 4/2012 | Gurion et al. |
| 2012/0158792 | A1 | 6/2012 | MacLaurin et al. |
| 2012/0180135 | A1 | 7/2012 | Hodges et al. |
| 2012/0197835 | A1 | 8/2012 | Costa et al. |
| 2012/0226749 | A1 | 9/2012 | Dale et al. |
| 2012/0246137 | A1 | 9/2012 | Sallakonda et al. |
| 2012/0290659 | A1 | 11/2012 | Rao et al. |
| 2012/0323704 | A1* | 12/2012 | Steelberg ............... G06Q 30/02 709/204 |
| 2012/0330856 | A1 | 12/2012 | Hyder et al. |
| 2013/0013526 | A1 | 1/2013 | Le Viet et al. |
| 2013/0036065 | A1 | 2/2013 | Chen et al. |
| 2013/0054598 | A1 | 2/2013 | Caceres |
| 2013/0097093 | A1 | 4/2013 | Kolber et al. |
| 2013/0166573 | A1 | 6/2013 | Vaitheeswaran et al. |
| 2013/0290206 | A1 | 10/2013 | Desai et al. |
| 2013/0290207 | A1 | 10/2013 | Bonmassar |
| 2013/0290208 | A1 | 10/2013 | Bonmassar et al. |
| 2013/0325734 | A1 | 12/2013 | Bixler et al. |
| 2014/0032435 | A1 | 1/2014 | Desai |
| 2014/0122355 | A1 | 5/2014 | Hardtke et al. |
| 2014/0143164 | A1 | 5/2014 | Posse et al. |
| 2014/0156675 | A1* | 6/2014 | Burstein ............... G06F 16/313 707/748 |
| 2014/0164290 | A1 | 6/2014 | Salter |
| 2014/0207699 | A1 | 7/2014 | Bonmassar et al. |
| 2014/0236530 | A1 | 8/2014 | Greene et al. |
| 2014/0344174 | A1 | 11/2014 | Ruan et al. |
| 2015/0025928 | A1 | 1/2015 | Kang et al. |
| 2015/0293997 | A1 | 10/2015 | Smith et al. |
| 2015/0310393 | A1 | 10/2015 | Bhaskaran et al. |
| 2015/0339785 | A1 | 11/2015 | Bischke et al. |
| 2016/0110424 | A1 | 4/2016 | Goeppinger et al. |
| 2016/0132830 | A1 | 5/2016 | Zhang et al. |
| 2016/0132909 | A1 | 5/2016 | Guidi et al. |
| 2016/0132953 | A1 | 5/2016 | Davar et al. |
| 2016/0292645 | A1 | 10/2016 | Polli et al. |
| 2016/0371625 | A1 | 12/2016 | Mosley et al. |
| 2017/0032326 | A1 | 2/2017 | Zhao |
| 2017/0061016 | A1* | 3/2017 | Lytkin ............... G06Q 30/0201 |
| 2017/0061382 | A1 | 3/2017 | Zhang et al. |
| 2017/0154268 | A1 | 6/2017 | Goldin |
| 2017/0154307 | A1 | 6/2017 | Maurya et al. |
| 2017/0154308 | A1 | 6/2017 | Duerr et al. |
| 2017/0236095 | A1 | 8/2017 | Schreiber et al. |
| 2018/0004822 | A1* | 1/2018 | Mulder ............... G06F 16/9024 |
| 2018/0039701 | A1* | 2/2018 | Pemble ................ G06F 16/957 |
| 2018/0039945 | A1 | 2/2018 | Posse et al. |
| 2018/0096306 | A1 | 4/2018 | Wang et al. |
| 2018/0121879 | A1 | 5/2018 | Zhang et al. |
| 2018/0121880 | A1 | 5/2018 | Zhang et al. |
| 2018/0173804 | A1 | 6/2018 | Kenthapadi et al. |
| 2018/0232751 | A1 | 8/2018 | Terhark et al. |
| 2019/0019159 | A1* | 1/2019 | Champaneria ..... G06Q 10/1053 |
| 2019/0026681 | A1 | 1/2019 | Polli et al. |
| 2019/0034883 | A1 | 1/2019 | Liang et al. |
| 2019/0042646 | A1 | 2/2019 | Hoang et al. |
| 2019/0102720 | A1 | 4/2019 | Jennings et al. |
| 2019/0295004 | A1 | 9/2019 | Chaturapruek et al. |

OTHER PUBLICATIONS

U.S. Appl. No. 16/384,789, filed Apr. 15, 2019, Mohamed et al.
U.S. Appl. No. 16/384,768, filed Apr. 15, 2019, Mohamed et al.
U.S. Appl. No. 13/910,018, filed Jun. 4, 2013, Bischke et al.
U.S. Appl. No. 13/910,054, filed Jun. 4, 2013, Bischke et al.
U.S. Appl. No. 14/814,210, filed Nov. 26, 2015, Bischke et al.
"Analyze My Writing," http://www.analyzemywriting.com/about_us.html, (1 page).
"Augmented Writing is a Learning Loop for Words," https://textio.ai/augmented-writing-is-a-learning-loop-for-words-5b0a6b2c0929, (7 pages).
"EasyEmail | Email Replies Drafted for You in Seconds," https://www.easyemail.ai/, (3 pages).
"FAQ Grammarly," https://www.grammarly.com/faq#toc1, (2 pages).
"For the Smarter Writer," https://prowritingaid.com/, (10 pages).
"Free Online Proofreading," https://typely.com, (3 pages).
"Hemingway Help," http://www.hemingwayapp.com/help.html, (4 pages).
"Thoughtful Productivity Software that Helps You Focus on What Matters," https://boomerangapp.com/about.html, (3 pages).
Bullhorn Reach. "Recruit the Best Talent," http://www.bullhornreach.com. Copyright 2013. Accessed on Jun. 23, 2015. 2 pg.
Bullhorn reach. How it works. Http://www.bullhornreach.com/reach/content/how-it-works. Copyright 2013. Accessed on Jun. 23, 2015. 2 pg.
Christen, Peter et al., "Efficient Entity Resolution with Adaptive and Interactive Training Data Selection", 2013 IEEE 13th International Conference on Data Mining, IEEE, Nov. 14, 2015 (6 pages).
GitHub. Gist is a simple way to share snippets and pastes with others. https://gist.github.com/. Copyright 2015. Accessed on Jun. 23, 2015. 1 pg.
H. Been. "Finding You on the Internet: Entity resolution on Twitter accounts and real world people," M.S. Thesis, University of Twente, Jun. 18, 2013. (89 pages).
International Search Report and Written Opinion for International Application No. PCT/US2016/068844 dated Apr. 4, 2017 (20 pages).

(56) References Cited

OTHER PUBLICATIONS

Lee, R., "Job Change Notifier," http://jobchangenotifier.com/. Copyright 2015. Accessed on Jun. 23, 2015. 1 pg.

LinkedIn. Rapportive. https://rapportive.com/. Copyright 2014. Accessed on Jun. 23, 2015. 2 pg.

Xobni. "Xobni has joined Yahoo!," http://address.yahoo.com/xobni. 2013. Accessed on Jun. 23, 2015. 5 pg.

Yi, X., et al., (2007) "Matching Resumes and Jobs Based on Relevance Models," Proc. of the 30th Annual International ACM SIGIR Conference on Research and Development in Information Retrieval (SIGIR 2007); pp. 809-810; Jul. 23-27, 2007.

Final Office Action dated Jul. 14, 2016 for U.S. Appl. No. 13/910,054, by Jonathan P. Bischke et al., Abandoned, 52 pages, IFW.

Office Action dated Oct. 5, 2015 for U.S. Appl. No. 14/814,210, by Jonathan P. Bischke et al., Abandoned, 53 pages, IFW.

Office Action dated Oct. 2, 2015 for U.S. Appl. No. 13/910,054, by Jonathan P. Bischke et al., Abandoned, 46 pages, IFW.

Mehta, Sameep, et al., "Efficient Multifaceted Screening of Job Applicants", EDBT/ICDT '13, Genoa, Italy, Mar. 18-22, 2013, pp. 661-671.

"Quantile", Wikipedia, Aug. 2022, 9 pages.

"Quartile", Wikipedia, Aug. 2022, 7 pages.

U.S. Appl. No. 13/910,029, titled "Systems and methods for Notification of Profile Activity Suggestive of Career Change Across Multiple Websites", filed Jun. 4, 2013, Abandoned (unpublished), IFW.

\* cited by examiner

METHODS FOR DYNAMIC CONTEXTUALIZATION OF THIRD-PARTY DATA IN A WEB BROWSER, AND RELATED SYSTEMS AND APPARATUS

CROSS-REFERENCE TO RELATED APPLICATION

This application is a continuation-in-part of U.S. patent application Ser. No. 16/385,385 titled "Systems having improved interfaces for search, and related methods and apparatus" and filed on Apr. 13, 2019, is a continuation-in-part of U.S. patent application Ser. No. 16/384,789 titled "Methods for interpreting predictive scores indicating the likelihood of an event's occurrence, and related systems and apparatus" and filed y on Apr. 15, 2019, is a continuation-in-part of U.S. patent application Ser. No. 16/384,768 titled "Methods for predicting the affinity between environments, and related systems and apparatus" and filed on Apr. 15, 2019, claims priority and benefit under 35 U.S.C. § 119(e) of U.S. Provisional Patent Application No. 62/657,830 titled "Systems having improved interfaces for search, and related methods and apparatus" and filed on Apr. 15, 2018, claims priority and benefit under 35 U.S.C. § 119(e) of U.S. Provisional Patent Application No. 62/657,863 titled "Methods for dynamic contextualization of third-party data in a user interface, and related systems and apparatus" and filed on Apr. 15, 2018, claims priority and benefit under 35 U.S.C. § 119(e) of U.S. Provisional Patent Application No. 62/657,836 titled "Methods for interpreting predictive scores indicating the likelihood of an event's occurrence, and related systems and apparatus" and filed on Apr. 15, 2018, and claims priority and benefit under 35 U.S.C. § 119(e) of U.S. Provisional Patent Application No. 62/657,862 titled "Methods for composing predictive scores indicating the affinity between entities, and related systems and apparatus" and filed on Apr. 15, 2018, each of which is hereby incorporated by reference herein in its entirety.

TECHNICAL FIELD

The following disclosure is directed to methods and systems for contextualizing data in a user interface and, more specifically, dynamic contextualizing of third-party data in a web browser.

BACKGROUND

A web browser extension (also referred to as a "web extension") is a software module that modifies or customizes a web browser. For example, web extensions can be used to modify the user interface of the web browser, change the functionality of a browser, block advertisements, or manage cookies. Web extensions are typically downloaded by a user and then installed on a web browser, such as Google Chrome, Mozilla Firefox, Microsoft Internet Explorer, etc.

SUMMARY

Frequently, a recruiter or hiring professional spends time online researching candidates for positions (e.g., jobs), company information, and/or industry information. However, it can be highly inefficient for a recruiter to look up additional or contextual information (e.g., in a separate web page or application) regarding a candidate as he or she browses websites (social media, company pages, institutional pages, etc.) related to candidates. Similarly, it can be highly inefficient for a user of a web browser to look up additional information in a separate web page or application on a company or industry of interest. The exemplary web browser extensions described herein can contextualize information provided on a website for the recruiter (user of the system) in real-time, or near real-time, thereby saving valuable resources in performing recruitment tasks.

The web extensions described herein include a user interface having contextual information summarizing information from sources other than the web page the user of the web extension is browsing. This enables summarized information to be presented to the user without requiring the user to open or launch additional web pages, software applications, etc. In some embodiments, data about candidates, companies, industries, job titles, etc. are collected in a database. This information is analyzed to generate summaries of the information relevant to respective candidates, companies, industries, or job titles. The web extension can extract content from the web page that the user is browsing and query the database for the contextual information related to the extracted content. Upon receiving the results of the query, the user interface of the web extension can present the contextual information to the user.

Importantly, the exemplary web extension enables a user to concisely view information related to the web page she is browsing while she is browsing that web page. Thus, the web extension delivers the relevant information in the context that she would want to see the information—within or overlaid on the web page being browsed. These capabilities reduce or eliminates unnecessary additional searching or navigating to other web pages or applications to access contextual information, which can be especially advantageous for users browsing on small screens (e.g., of a smart phone or tablet computer). Note that, in some embodiments, the presented information can be further customized for the user by presenting the information the user has indicated she prefers to view. In some embodiments, the information is customized based on the characteristics of the user. For example, the user interface of the web extension may present a list of companies similar to the company associated with that user (e.g., the employer of the user or the company for which the user is recruiting a candidate).

Further, the dynamic contextualization facility of the web extension is 'intelligent' in that the web extension selects and presents the data based on AI tools that infer the relevance of third-party data to the web page using predictive models. For example, for a given company name in a web page the user is browsing, the web extension can leverage a predictive model for determining one or more other companies that are similar to the company with the company name in the web page based on a measure of affinity or compatibility. This can aid a recruiter or a researcher in quickly identifying not just one company but multiple companies of interest. In another example, for a given candidate name in a web page the user is browsing, the web extension can leverage a predictive model for determining the likelihood of an employment transition by the candidate from a current employer to another employer. This enables a recruiting or hiring professional to determine whether to expend resources (e.g., time and money) in targeting that candidate for recruiting. If the contextual information provided by the web extension indicates that the candidate is likely to switch positions in a near term, the recruiter can identify the candidate and begin the process of recruiting that candidate.

Additionally, the process of searching for additional or contextual information can consume electrical power resources (e.g., energy), computational resources (e.g., processor cycles), and/or communication network resources (e.g., bandwidth). Thus, there is a need for techniques that facilitate quick reference of information while limiting the amount of resources used to perform that reference. Therefore, computing and processing resources can be conserved and/or the use of computing and processing resources can be made more efficient by avoiding the need for additional web pages to supply contextual or additional information for the recruiting or hiring professional.

In general, one innovative aspect of the subject matter described herein can be embodied in a computer-implemented method including: providing an extension for a web browser, the extension having a user interface configured to occupy a portion of a user interface associated with the web browser; intercepting content fetched by the web browser for a web page, the web page being a company page, a social media page, or a professional page; processing the fetched content for the web page to extract information including: (i) a company name, (ii) a candidate name, (iii) a job title, and/or (iv) an industry name; querying a database for contextual information based on the extracted information, the contextual information being a summary of information obtained from one or more sources other than the web page; and presenting, via the user interface of the extension, the contextual information including: (a) company information based on the company name, (b) candidate information based on the candidate name, (c) job title information based on the job title, and/or (d) industry information based on the industry name.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiment, the method can further include, prior to the query being received by the database, generating and storing the summary of information obtained from one or more sources other than the web page in the database. In some embodiments, the one or more sources other than the web page can include: (i) another web page, (ii) an application, and/or (iii) a predictive model. In some embodiments, the portion of the user interface occupied by the extension can overlap with a portion of the user interface occupied by the web page. In some embodiments, the portion of the user interface occupied by the extension is adjacent with a portion of the user interface occupied by the web page. In some embodiments, the user interface of the extension can be configured to occupy a first portion of the user interface associated with the web browser. In some embodiments, the method can include upon detecting browsing of the web page by a user of the web browser, changing an appearance of the user interface of the extension to occupy a second portion of the user interface.

In some embodiments, the first portion is smaller than the second portion. In some embodiments, the first portion overlaps the second portion. In some embodiments, the method can include upon detecting that the user has selected the user interface of the extension, changing a size of the user interface of the extension to occupy the second portion, the second portion occupying more display area than the first portion. In some embodiments, if the candidate name is extracted from the fetched content, the method can include: presenting, via the user interface of the extension, a measure of affinity between a company associated with the candidate name and a company associated with a user of the web browser. In some embodiments, the method can include receiving a predictive signal indicating the measure of affinity between the company associated with the candidate name and the company associated with the user of the web browser. In some embodiments, if the company name is extracted from the fetched content, the method can include: presenting, via the user interface of the extension, a measure of affinity between a company associated with the company name and a company associated with a user of the web browser.

In some embodiments, if the candidate name is extracted from the fetched content, the method can include: presenting, via the user interface of the extension, a predictive score indicating a likelihood of an employment transition by a candidate having the candidate name. In some embodiments, the method can include: receiving a predictive signal indicating the likelihood of the employment transition by the candidate having the candidate name. In some embodiments, if the candidate name is extracted from the fetched content, the method can include: presenting, via the user interface of the extension, data indicating an extent to which a candidate having the candidate name is an outlier among similar candidates. In some embodiments, the method can include: receiving a predictive signal indicating the extent to which the candidate having the candidate name is an outlier among similar candidates. In some embodiments, the method can include: detecting, by the web extension, whether the intercepted content is associated with a social media page, a professional page, and/or a company page. In some embodiments, if the web extension detects that the intercepted content is a professional page, the method can further include identifying, by the web extension a company name and/or an industry name included in the professional page; and presenting, by the web extension, company information based on the company name and/or industry information based on the industry name.

In some embodiments, the method can include: detecting, by the web extension, data associated with the user viewing the web page, wherein the data includes a company name associated with the user and/or an industry name associated with the user; and presenting, via the user interface of the web extension, company information related to the company name associated with the user and/or industry information related to the industry name associated with the user. In some embodiments, if the company name is extracted from the fetched content, the method can include: identifying, based on or more criteria, a plurality of second companies similar to a first company associated with the company name; and presenting, via the user interface of the extension, names of one or more of the second companies similar to the first company. In some embodiments, the method can include receiving predictive signals indicating respective measures of affinity between the plurality of second companies and the first company, wherein the names of the one or more second companies presented via the user interface extension are selected based on the measures of affinity between the one or more second companies and the first company.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Disclosed herein are exemplary embodiments of systems and methods for providing dynamic contextualization of third-party data in a web browser, via an extension for the web browser. While the below examples are provided in the context of candidate recruitment, the methods and systems described herein are applicable in many different contexts. For example, a student may need more information on certain advanced topics in a web pages as he or she is researching a particular subject for a school assignment. In another example, a sports analyst may need quick information regarding one or more sports teams or players that he or she is researching as part of a project or journalistic article.

The methods and systems described herein can be used to aid recruiters and hiring professionals in researching potential candidates. In the context of candidate recruitment, the exemplary web extension described herein can be used with any website related to a person, company, and/or industry. Examples of such websites include, but are not limited to, Facebook, LinkedIn, Twitter, GitHub, Business Wire, Bloomberg, Bebee, Google Plus, Bitbucket, Academia.edu, AboutMe, Kaggle, Lanyrd, Quora, Stack Overflow, Dribbble, Behance, Crunchbase, InsideView, Mattermark, etc. The exemplary web extension can be used to increase efficiency of gathering information about a person, a company, and/or industry referenced in the content of a web page without leaving the web page itself. In the interest of clarity and conciseness, the methods and systems of FIGS. 1-5 will be described together in context in the following.

Web Extension

Figure 1A:
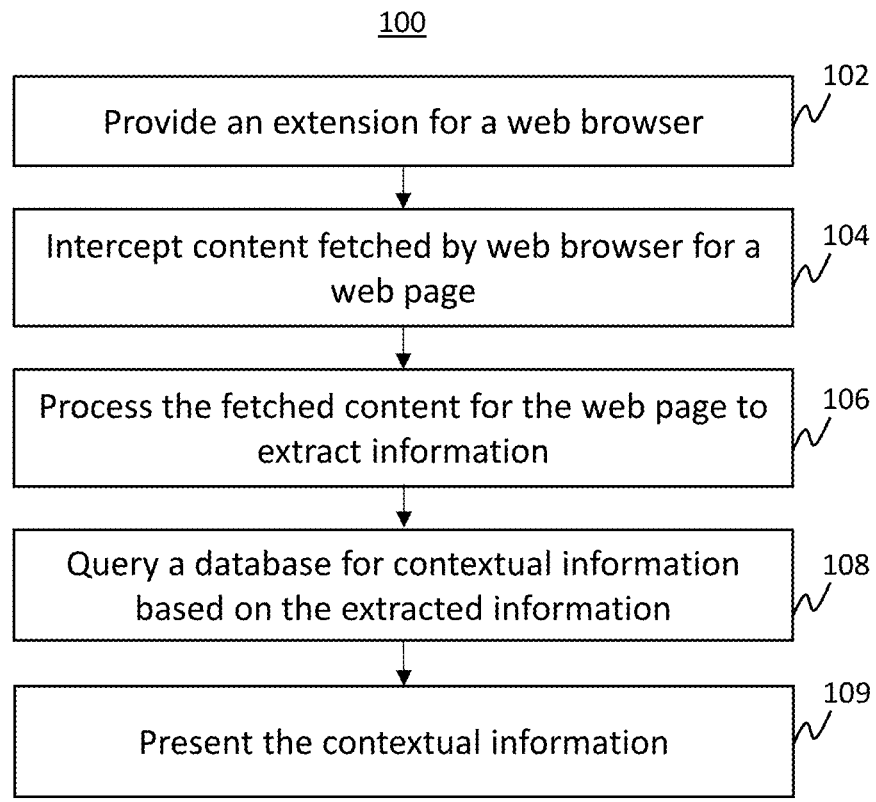
FIG. 1A is a flowchart illustrating an exemplary method for providing dynamic contextualization of third-party data in a web browser, via an extension for the web browser.

FIG. 1A is a flowchart illustrating a method 100 for providing dynamic contextualization of third-party data in a web browser, via an extension for the web browser (e.g., a "web extension"). As used herein, the phrase "web extension" may refer to any software module (e.g., plug-in, add-in, add-on, etc.) that extends the functionality of a web browser or the functionality of any other application (e.g., e-mail client, etc.) that sends and/or receives data via a communication network (e.g., the Internet).

Figure 1B:
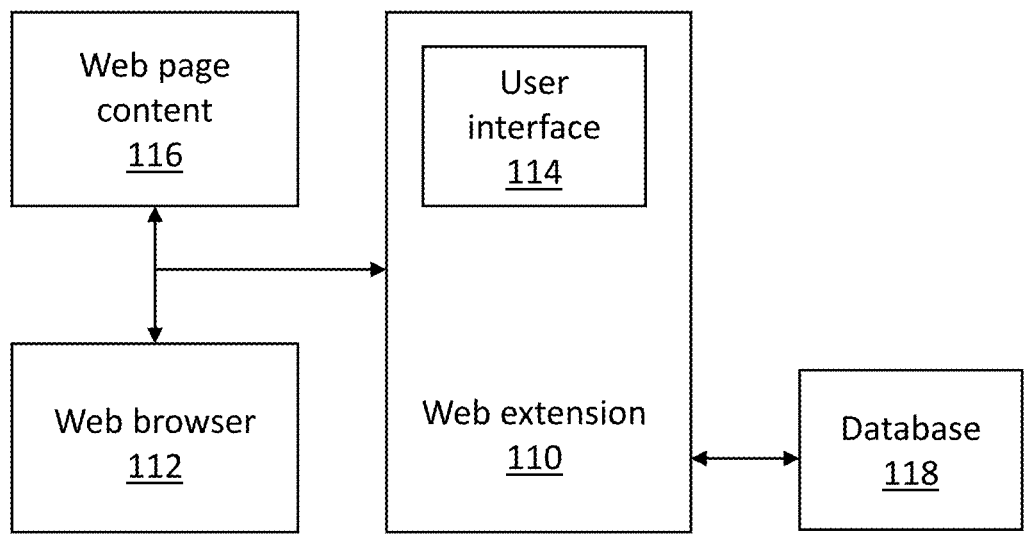
FIG. 1B is a block diagram of an exemplary system for providing dynamic contextualization of third-party data in a web browser.

FIG. 1B is a diagram of a system for providing dynamic contextualization of third-party data in a web browser 112. The system includes a web extension 110, which has a user interface 114. The web extension 110 is configured to intercept and process content (e.g., web page content 116) accessed by the web browser 112. The extension 110 may execute within the same software environment as the web browser 112, and/or within the same browser environment as the content 116 that is downloaded from each web page. The web extension 110 may parse and/or filter the web page content 116 based on its structure. For example, the web extension 110 may extract a name (e.g., a company name or a candidate name) from the web page based on attributes of the data encoding the name in the underlying representation of the web page (e.g., its format, placement, associated tags, etc.). The web extension 110 is configured to access a database 118 to provide contextual information to the user interface 114, as described in more detail below.

Referring again to the method of FIG. 1A, in step 102, the web extension 110 is provided for the web browser 112. The web extension may be installed by the user or web browser directly. Alternatively, the user may be prompted to install the web extension in the web browser.

In step 104, the web extension 110 intercepts content 116 fetched by the web browser 112 for the web page. For example, the web page can be a company website (e.g., the home website of the company), social media page (e.g., Facebook page, Twitter page, Instagram page, etc.) associated with a company, or a professional page (e.g., LinkedIn page, Bloomberg business page, CrunchBase profile, etc.). In another example, the web page can feature a person (e.g., a candidate of interest to a recruiter or hiring professional). The web page can be a social media page or professional page of the candidate. The web page can include information including a company name, a candidate name, a job title, and/or an industry name. In several instances, the web page may include two or more pieces of information (e.g., a company name and a candidate name, a company name and a job title). The exemplary web extension may intercept content that includes at least one of the pieces of information.

In step 106, the web extension 110 processes the fetched content 116 for the web page to extract information. The extension 110 can extract information from the fetched content including a company name, a candidate name, a job title, and/or an industry name. In some embodiments, the extension 110 can extract information using web scraping tools (e.g., Import.io, Mozenda, Outwit Hub, etc.). In some embodiments, the extension 110 can seek particularly structured data to extract information. For example, the extension can extract a candidate's name based on commonly-used name structures (e.g., a first name, middle name or middle initial, and a last name). In another example, the extension can extract a job title based on commonly-used name structures and titles (e.g., chief operating officer, chief technical officer, etc.).

In step 108, the web extension 110 queries a database 118 for contextual information based on the extracted information. In some embodiments, data from sources other than the web page (e.g., third-party sources, other web pages, artificial intelligence tools, predictive models, software applications, databases, etc.) can be obtained and analyzed for storing in the database. For example, LinkedIn pages may be accessed and analyzed so as to extract information (e.g., candidate name, candidate biography, candidate work experience, candidate education, etc.). A summary of the data from other sources can then be generated for storing in the database. In some embodiments, prior to the query being received by the database from the web extension, the summary of information is generated and stored in the database. Importantly, the querying of a database for contextual information enables a user to access third-party information related to the information she is viewing in the web page without having to navigate to, search for, and/or download the third-party information. For example, the user may be viewing a company page listing the company's founders. The web extension 110 can process the content for that web page to extract names of the founders and access summarized information about the founders from the database 118. The summarized information about a founder may have been derived from that founding person's LinkedIn page, Facebook page, etc.

In step 109, the web extension 110 presents, via the user interface 114, the contextual information. Depending on the type of information available in the web page being viewed by the user, the contextual information can include company information based on a company name in the web page, candidate information based on candidate name in the web page, job title information based on a job title in the web page, and/or industry information based on the industry name. Examples of the contextual information are provided further herein below. For example, job title information can include the seniority of that job title relative to other job titles of the same industry or the prevalence of the job title. In some cases, contextual information may include other similar candidates having the job title may be presented.

Figure 2A:
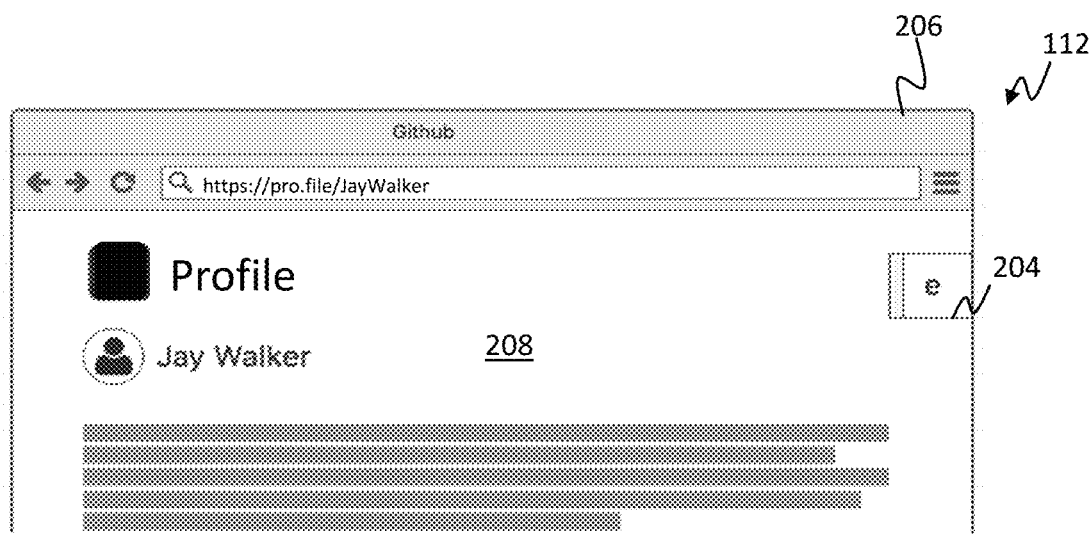
FIG. 2A is a graphical representation of a web browser having the exemplary web extension.

FIG. 2A is a graphical representation of a web browser 112 having the web extension 110. In some embodiments, the presence of the extension 110 is signaled by an icon 204 on a side (e.g., the right side) of the window 206 of the web browser 112 (within the area contained in the user interface associated with the web browser 112). As a user is browsing a web page 208, the web extension 110 may change the appearance of the extension icon 204 to attract the notice of the user to the web extension's functionality.

Figure 2B:
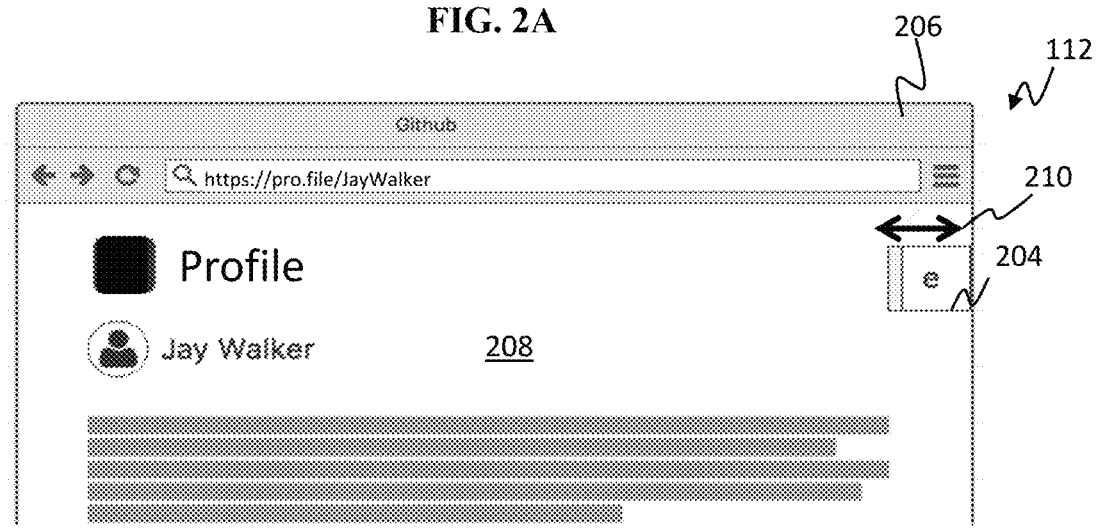
FIG. 2B is a graphical representation of the web browser having the exemplary web extension, illustrating motion of the web extension (e.g., upon detection of web page content).
Figure 2C:
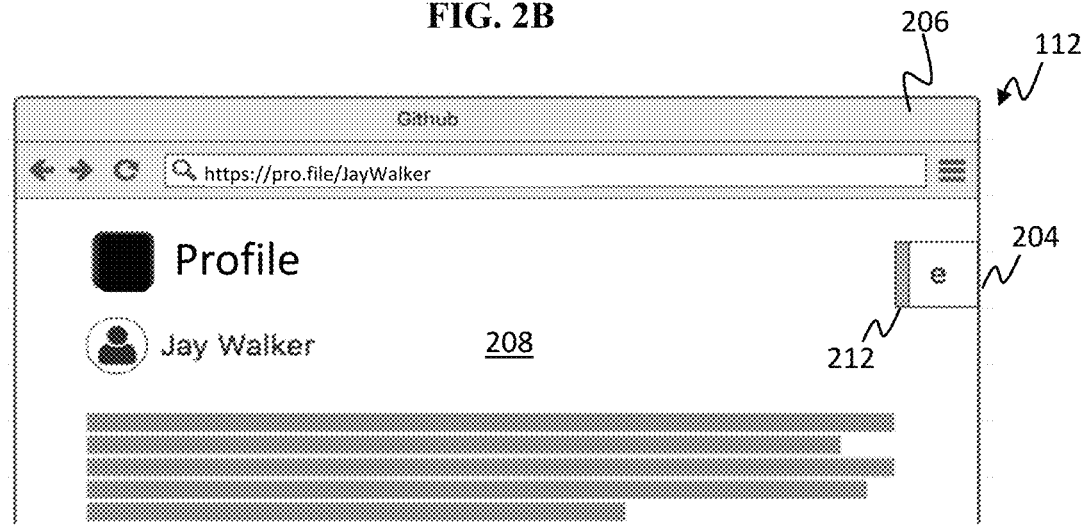
FIG. 2C is a graphical representation of the web browser having the exemplary web extension, illustrating color change of the web extension (e.g., upon detection of web page content).

For example, a user (e.g., a recruiter or hiring professional) may be viewing the social media or professional page of a potential candidate. In the example of FIGS. 2A-2C, the web page 208 being viewed by the user is operated by a service that provides profiles and contains information about a person, Jay Walker. In FIG. 2B, the icon 204 moves (e.g., side-to-side with a wiggling motion 210) to signify that a match to the web page content (e.g., third-party data relevant to the web page content) has been found by the web extension 110. Additionally, or alternatively, in FIG. 2C, the icon 204 (or a portion thereof) turns a different color to signify a match has been found. The user viewing the web page 208 may choose to click on the web extension icon 204 to view more of the web extension's user interface, as described further below.

In some instances, the web extension 110 detects that the intercepted content (e.g., web page content) is a social media page, a professional page, and/or a company page. In some embodiments, the web extension 110 can detect content related to the contacts of the main profile. For example, if the main profile content of web page 208 in FIGS. 2A-2C is about the candidate Jay Walker, the web extension 110 may also be able detect friends or professional contacts of Jay Walker's.

In some embodiments, the web extension 110 may limit or customize the contextual information provided to the user based on attributes of the intercepted web page content. For example, the extension 110 may not provide company or industry related information if the web page is a social profile. However, if the web page is a professional page, the company or industry related information can be included as a default.

Candidate Insights

Figure 3:
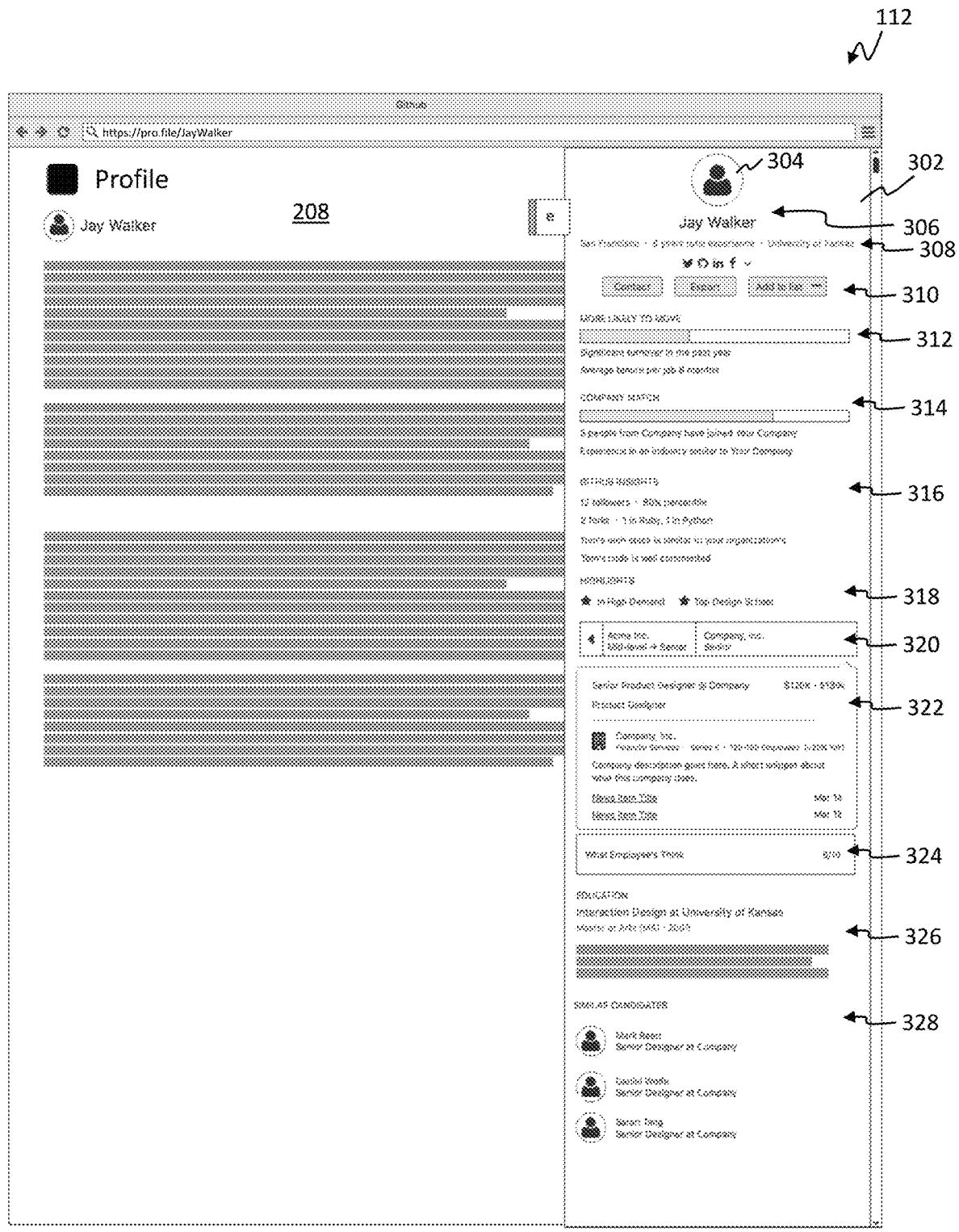
FIG. 3 is a graphical representation of a user interface for a web browser having the exemplary web extension, in which the user interface presents third-party data that contextualizes the content of a web page, according to some embodiments.

FIG. 3 is a graphical representation of a user interface for a web browser 112 having web extension 110, in which the user interface presents a summary of information (e.g., third-party information) that contextualizes content of a web page relating to a candidate. In this embodiment, web extension 110 intercepts and/or extracts data from the web page 208, and processes the intercepted/extracted data to detect web page content related to a candidate. The web extension 110 accesses additional and/or contextual information related to the candidate from a database 118 to provide to the user via the user interface 114. For example, the web extension 110 may use techniques such as fuzzy-matching or cluster association to access contextual information relevant to the content of the web page.

In this example, the user interface 114 of the web extension 110 is a side panel 302 having a column of candidate-related information. The contextual candidate information in the side panel 302 can include a picture 304 of the candidate; candidate name 306; candidate location, experience, and/or education 308; links 310 to web pages associated with the candidate and/or to actions performable by the web extension 110 using the candidate's data (e.g., contacting the candidate, exporting the candidate's data, adding the candidate to a list of candidates, etc.); a predictive signal indicating how likely the candidate is to move positions 312; a company match indicator 314 indicating the extent of the "match" or "fit" between the candidate's current company and another company of interest to the user (e.g., a company for which the user is recruiting candidates); insights 316 specific to the web page 208; highlights 318 from the candidate's profile or resume (e.g., publications, awards (for example, "GitHub All Star"), etc.); the candidate's career timeline 320; information and/or news 322 related to the candidate's company; company ratings 324 (e.g., provided by company employees or others); details of the candidate's educational history and/or credentials 326; and/or information identifying candidates 328 similar to the candidate.

In some embodiments, to present a predictive signal indicating how likely the candidate is to move positions 312, the web extension 110 may access a system for predicting the likelihood of employment transition by the candidate. Examples of systems and methods configured to predict the likelihood of an employment transition by a candidate can be found in U.S. patent application Ser. No. 16/384,789 titled "Methods for interpreting predictive scores indicating the likelihood of an event's occurrence, and related systems and apparatus" filed Apr. 15, 2019, and in U.S. patent application Ser. No. 13/910,029 titled "Systems and methods for notification of profile activity suggestive of career change across multiple websites" and filed on Jun. 4, 2013, each of which is hereby incorporated by reference herein in its entirety.

In some embodiments, to present the company match indicator 314, the web extension 110 may access a system for determining a measure of affinity or compatibility between the candidate's company and a company of interest to the user. A higher company match score may be indicative of an increased likelihood that the target company is a "fit" for the candidate (e.g., because the candidate's company is highly similar to the target company, or because other candidates have successfully transitioned from the candidate's company to the target company at a rate greater than or equal to a threshold value. For example, the target company and the candidate's company may be matched based on shared attributes, similarity of specialties, and/or the number of employees that have moved from the candidate's company to the target company (or vice versa). Examples of systems and methods configured to determine the measure of affinity can be found in U.S. patent application Ser. No. 16/384,768 titled "Methods for interpreting predictive scores indicating the affinity between environments, and related systems and apparatus" filed Apr. 15, 2019.

In some embodiments, the web extension may identify similar candidates (and/or determine a candidate's relevancy in the similar candidates list 328) based on attributes of the candidates and on one or more of the user's recent searches.

In some embodiments, candidate insights can include information regarding the candidate's status and/or qualifications (e.g., career trajectory information, known salary information, current or past positions, etc.). Additional insights may be provided in connection with the candidate's job title, including but not limited to: seniority level (as compared to other well-known titles), transitions to and from the title, salary range associated with the title, etc. Title information may be especially helpful to recruiter who is not knowledgeable in a particular industry or if a company has creatively-assigned titles not commonly found in similar companies. In some embodiments, contextual candidate information can include qualifications of the candidate and/ or whether the candidate is over-qualified or under-qualified relative to other candidates.

In some embodiments, a predictive model may be used to determine the status (e.g., seniority) of a candidate and/or whether the candidate is over-qualified or under-qualified relative to other candidates. Specifically, a trained predictive model can be configured to determine a status score of a candidate in a first position and predict an extent to which the candidate is qualified to transition from the first position to a second position based on the status score. Examples of methods and systems for determining a status of a candidate and/or the qualifications of a candidate can be found in U.S. Ser. No. 16/149,693, titled "Methods for determining entity status, and related systems and apparatus" and filed on Oct. 2, 2018, which is hereby incorporated by reference herein in its entirety.

Company Insights

Figure 4:
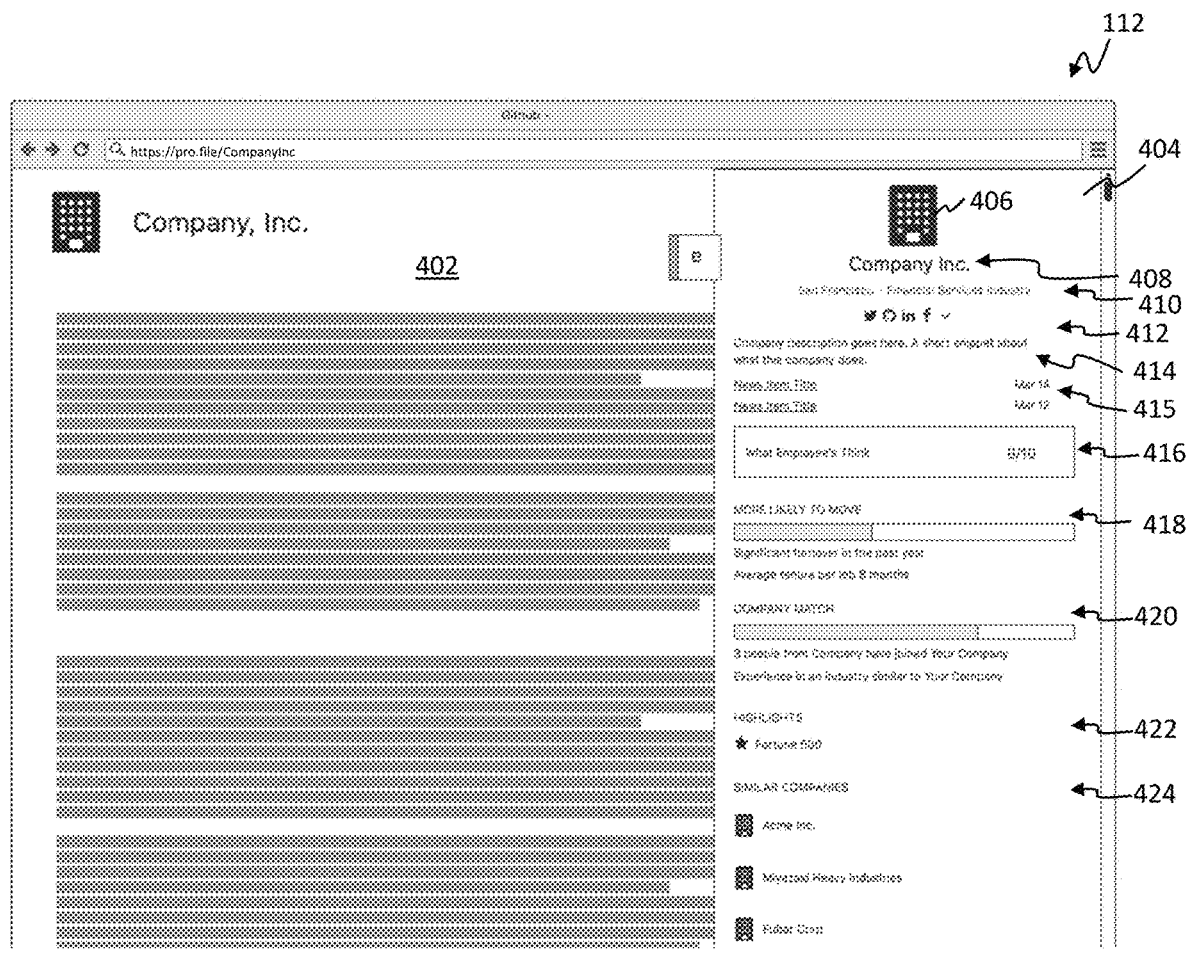
FIG. 4 is a graphical representation of another user interface for a web browser having the exemplary web extension, in which the user interface presents third-party data that contextualizes the content of a web page, according to some embodiments.

FIG. 4 is a graphical representation of another user interface for a web browser 112 having web extension 110, in which the user interface presents a summary of information (e.g., third-party information) that contextualizes content of a web page relating to a company. In this embodiment, web extension 110 intercepts and/or extracts data from the web page 208, and processes the intercepted/extracted data to detect web page content relating to a company. The web extension 110 accesses additional and/or contextual information related to the company from a database 118 to provide to the user via the user interface 114. For example, the web extension 110 may use techniques such as fuzzy-matching or cluster association to access contextual information relevant to the content of the web page. In some embodiments, the web extension 110 provides company related contextualization if no candidate-related profile is detected.

In this example, the user interface 114 is a side panel 404 having a column of company-related information. The contextual company information in the side panel 404 can include a company symbol 406 (e.g., a trademark, icon, logo, picture, etc.); company name 408; company location and/or industry 410; links 412 to web pages associated with the company; company description 414; news items 415 associated with the company; company ratings 416 (e.g., provided by employees, third-party services, etc.); predictive signal indicating how likely candidates from this company are to move positions 418; a company match indicator 420 indicating the extent of the "match" or "fit" between the company and another company of interest to the user (e.g., a company for which the user is recruiting candidates); company highlights 422; and/or similar companies 424. Company description 414 and/or news 415 can include industry information, size, news related to the company, job postings, trends, and the like.

In some embodiments, the company-related insights provided in the web extension panel 404 can include the growth rate of the company. For example, an increase in employee count can be indicated in green, a decrease can be indicated in red, etc. and can be measured for a fixed term such as a year or quarter. In some embodiments, the panel 404 may indicate which employees have recently left or joined the company.

The company ratings 416 may include internal ratings (e.g., ratings provided by the company or by company stakeholders, for example, employees) and/or external ratings (e.g., ratings provided by third parties). The ratings may pertain to the company as a whole and/or to aspects of the company, including but not limited to the company's culture, leadership, affinity, brand acceptance, diversity, etc. Some or all of this rating information can be pulled from websites such as Comparably, Glassdoor, Twitter, Facebook, Crunchbase, InsideView, Mattermark, etc.

In some embodiments, the web extension 110 may identify candidates employed by or otherwise associated with the company that is the subject of the panel 404, and information associated with those candidates may be presented in the panel 404. For example, links to profiles of company employees who are in demand, most clicked, most searched, etc. can appear in the company insights. These profiles may be grouped by skill, position, career-level, etc. In some embodiments, the candidate profiles from the particular company may be filtered by a job title that is of interest to the user (e.g., a job title for which the user has recently searched). In addition or in the alternative, the candidate profiles from the particular company may be filtered such that the profiles of employees who are unlikely to leave the particular company are not shown. Some embodiments of techniques for predicting whether a candidate is likely to transition out of a position with the candidate's current company are described above.

In some embodiments, the information presented to the user via the user interface of the web extension 110 can be customized based on data (e.g., user account data) associated with the user viewing the web page. For instance, the company match score 314 or 420 may indicate the extent of the "match" or "fit" between two companies (e.g., a company X identified based on the content of the web page 208 or 402, and a company Y identified by or otherwise associated with the user). This information can be particularly useful for recruiters looking for candidates who are expected to easily transition from their current companies to company Y. Some embodiments of techniques for determining the extent of the "match" or "fit" between two companies are described above.

In another example, web extension 110 can identify other companies as "similar companies" 424 and/or control the manner (e.g., order) in which the similar companies 424 are presented in the panel 404 based on attributes of the company X currently profiled in the panel 404, attributes of the company Y associated with the user, and/or attributes of the other companies Z. For instance, among the companies that are similar to the company X currently profiled in the panel 404, the companies at the top of the "similar companies" list 424 may be those companies that are most similar in size and type to the company Y associated with the user.

In some embodiments, the web extension may identify a company Z as being similar to the company X profiled in the panel 404 based on the extent of the affinity between the companies (e.g., extent of the similarity between characteristics of the companies, which may include industry, category, sector, size, technology area, role, etc.). In some embodiments, the similar companies list 424 may be defined by characteristics for company similarity. For example, characteristics can include one or more of the above characteristics. Further, each characteristic can have a threshold. For example, if the characteristic is the size of the company, the threshold for similarity in size may be a certain order of magnitude of employee headcount, or may be determined by revenue or number of locations.

In some embodiments, the system may infer that two companies A and C are similar if the system determines that (1) companies A and B are similar, and (2) companies B and C are similar. In other words, the system may treat company similarity as a transitive property. In some embodiments, the system may infer indirect similarity between two companies A and C if and only if the number of companies linking companies A and C in the transitive chain is less than or equal to a threshold number (e.g., one, two, three, five, etc.).

In some embodiments, thresholds can be set for each shared characteristic. Thus, only companies having a characteristic (or a plurality of characteristics) above a certain threshold may be included. For example, if the profiled company X is a large automobile brand company (e.g., Ford), the relevant characteristics may be that the company size (large), industry (auto), and role (brand-level). Thus, the similar companies list 424 may be determined by thresholds on each of the characteristics size, industry, and/or role. Matching companies on the list, for example, may include General Motors and Nissan, but may not include smaller, auto supply companies such as Schmald Tool & Die of Michigan. If the thresholds on size, industry, and role characteristics were particularly rigid, even large auto suppliers would be excluded, such as Robert Bosch GmbH or Continental AG. Here, the size and industry of the companies are a match to the user's company, but the role is not. Note that the user may be able to change threshold settings or remove one or more thresholds from the criteria for identifying the similar companies 424. Additionally, or alternatively, the companies within the similar companies list 424 can be ranked highest to lowest based on a comparison to the threshold.

In some embodiments, the web extension 112 may filter similar companies and/or control the manner in which the similar companies 424 are presented in the panel 404 based on company match scores, data associated with employee transitions between companies, etc. For example, the web extension 112 may identify a company Z as a "similar company" only if a measurement of transitions between the company Z and the company Y associated with the user exceeds a threshold value. This threshold value can, for example, relate to an absolute number of transitions between the companies, a score associated with transitions between the companies, a percentage of employees who have transitioned between the companies, etc.

For example, the threshold value may be related to the number of employees that have transitioned between the company Y related to the user and the other company Z. Such "transitions" may be quantified by measuring, for example, the number of employees who have worked at company Y after working at company Z (e.g., immediately after working at company Z), and/or the number of employees who have worked at company Z after working at company Y (e.g., immediately after working at company Y). In some examples, a negative numerical transition value indicates a number of employees that have left the company Y associated with the user and subsequently worked for the other company Z. A positive numerical transition value may indicate a number of employees that have joined the company Y associated with the user after working for the other company Z. In some embodiments, the similar companies list 424 can be composed of some or all companies Zi such that a measurement of transitions between company Y and company Zi exceeds a threshold value. For example, a company Zi may be included in the similar companies list if the number of transitions between company Zi and company Y exceeds 0, 1, 2, 5, 8, 10, or any other suitable number of transitions. As another example, a company Zi may be included in the similar companies list if the ratio of (1) the number of transitions between company Zi and company Y to (2) the total number of employees of Y exceeds 0%, 1%, 2%, 5%, 8%, 10%, or any other suitable percentage.

Transitions between company Y and company Z may include direct transitions between Y and Z (e.g., cases in which an employee transitions directly from company Y to company Z or directly from company Z to company Y). In some embodiments, transitions between company Y and company Z may also include second-order and/or indirect transitions between Y and Z (e.g., cases in which an employee transitions from company Y to company X to company Z, or from company Z to company X to company Y).

In some embodiments, the web extension may be able to detect the most relevant company-related information based on the transition information. For instance, a user associated with company A may be viewing the web page 402 which includes content related to companies A, B, and C. If there has been at least one employee transition between companies A and B, but no employee transitions between companies A and C, the web extension may only provide information related to company B in its user interface.

Industry Insights

In some embodiments, the web extension 110 is configured to provide industry related insights. These insights can include top companies in the same industry as the profiled company with significant activity. For example, significant activity can include company-level transition, turnover, etc. Other information can include relevant news, culture information, leadership information, external or internal reviews, etc. Some or all of this information can be supplied from sites such as Comparably, Glassdoor, Twitter, Facebook. Other information can include employee transition rates and information between companies in the industry. Additionally, or alternatively, candidate profile information may be included. For example, top candidate profiles based on demand, click-rate, etc. may be included in the industry insights.

In some embodiments, the web extension can be configured to identify companies that are not performing well in the industry. Performance of a company within an industry can be normalized based on performance of the industry as a whole. For example, growing companies with increasing revenues can be poorly performing in a booming industry, and contracting companies with decreasing revenues can be performing well in a contracting industry. This information can be useful in locating candidates looking to leave poorly-performing companies, especially those profiles based on past user searches and preferences.

User-Specific Contextualization

Figure 5:
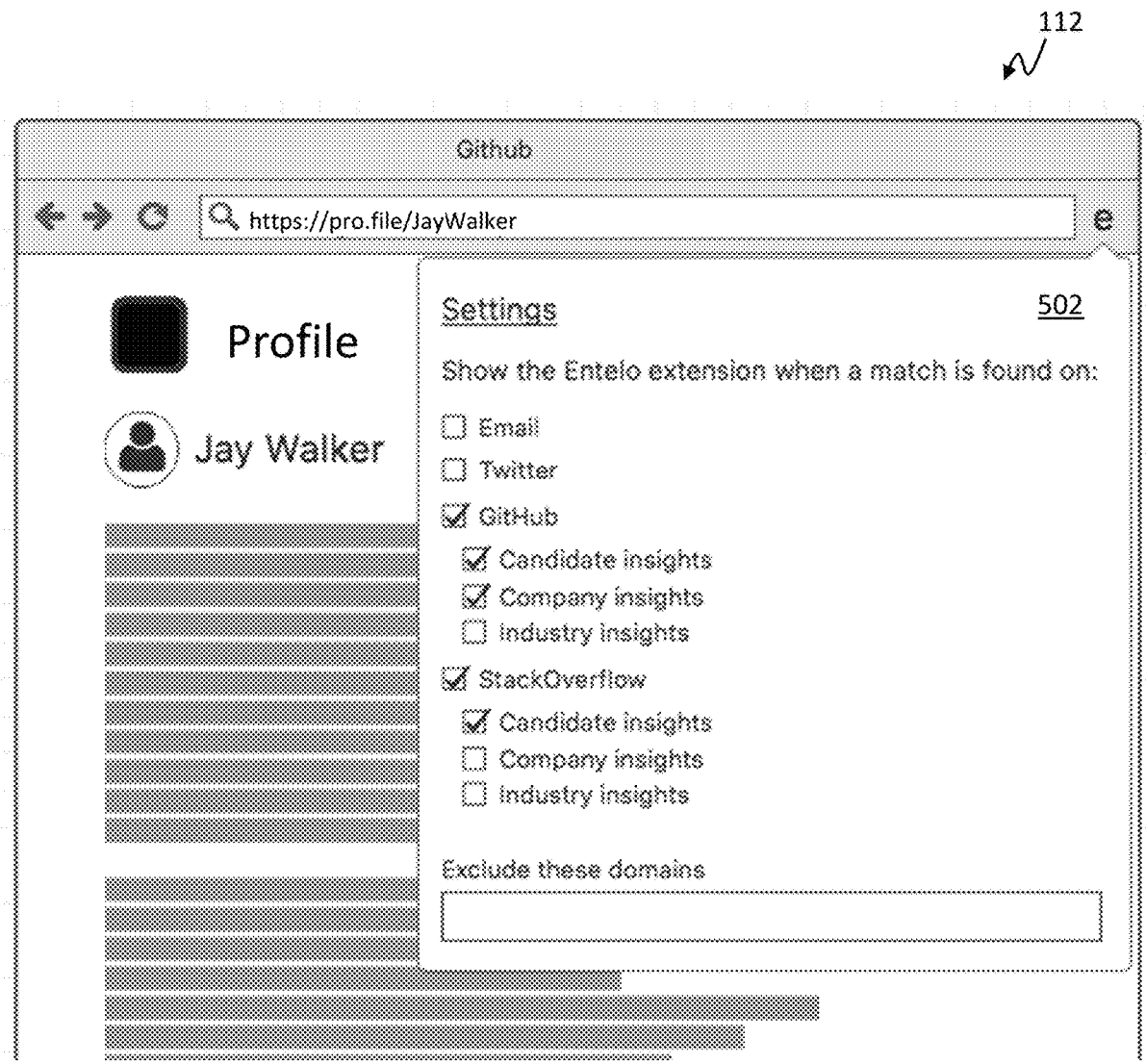
FIG. 5 is a graphical representation of a settings menu for the exemplary web extension, according to some embodiments.

In some embodiments, any of the information presented in the extension 110 can be ranked, filtered, and/or aggregated according to the user. For example, the user can manually specify filtering criteria to be applied to information presented by the web extension 110. FIG. 5 is a graphical representation of an extension settings menu 502 for a web extension 110. The user can select insights he or she prefers to see, selecting from candidate insights (refer to FIG. 3), company insights (refer to FIG. 4), or industry insights. In further embodiments, the user can select the order of priority for viewing each of these insights. Additionally, or alternatively, if user toggles the industry insights off, and keeps candidate insights on, any further browsing activity will only show candidate profile information. These settings can be saved with the user's account. The user can reset to the default viewing options at any time. Further, the user can choose whether to enable data collection to improve relevance experience in the future. Note that, in some embodiments, the user may have the extension 110 disabled. If the web extension was disabled, he or she would manually turn on the web extension at the time he or she wished for contextualized information. In some embodiments, the setting to turn on or off the web extension 110 is part of the web page, such as the social media page.

In some embodiments, the web extension 110 is configured to collect information on user behaviors as related to use of the web extension. With this data, the extension 110 can analyze usage patterns by user types, similar user companies, similar user company size, similar user industry, etc. By this method, the web extension 110 can apply user-specific settings based on the particular user's behavior. For example, most users of a similar category of users may click on company-level information 322, but a particular user may always click through the similar candidates list 328.

In some embodiments, if the candidate related to the web page 208 is particularly exceptional as based on the more likely to move metric 312 or matches the user's most recent search parameters, the web extension may automatically appear on the candidate's web page 208.

Further Description of Some Embodiments

In some embodiments, systems and methods for providing dynamic contextualization of third-party data in a user interface include a plug-in for the user interface. A plug-in is a software component that is configured to add one or more features to a computer program (e.g., an application, web browser, email client, etc.). A plug-in may be referred to as an "add-in" or an "add-on." For example, a plug-in may be configured to provide candidate-related, company-related, and/or industry-related insights in a locally-executed email application (e.g., Microsoft Outlook) or in a web-based email client (e.g., Gmail). As a user of the email client is viewing his or her emails, the plug-in may provide insights related to the content of the email.

In another embodiment, a plug-in for a map application may be configured to provide company-related insights in a view of a map. Map applications can include, but are not limited to, Google Maps, Apple Maps, Waze, etc. For example, as a user is viewing an area in a map, company locations may be "pinned" or highlighted to the user. The plug-in may, upon request or automatically, provide company-related information related to the companies in the particular view.

Some embodiments have been described in which a web extension intercepts or extracts data from a third-party web page, queries a database for additional and/or contextual information related to a person, company, or industry associated with the intercepted/extracted data, and provides the additional/contextual information to a user via a user interface. In some embodiments, the information intercepted or extracted from the third-party web pages is not added to the database or otherwise persistently stored by the system. Some implementations of a system in which a web extension intercepts or extracts data from a web page, queries a database for additional and/or contextual information related to the intercepted/extracted data, and provides the additional/contextual information to a user via a user interface are described in U.S. patent application Ser. No. 14/814,210 titled "Systems and methods for accessing third party data on websites" and filed on Jul. 30, 2015, which is hereby incorporated by reference herein in its entirety.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 6:
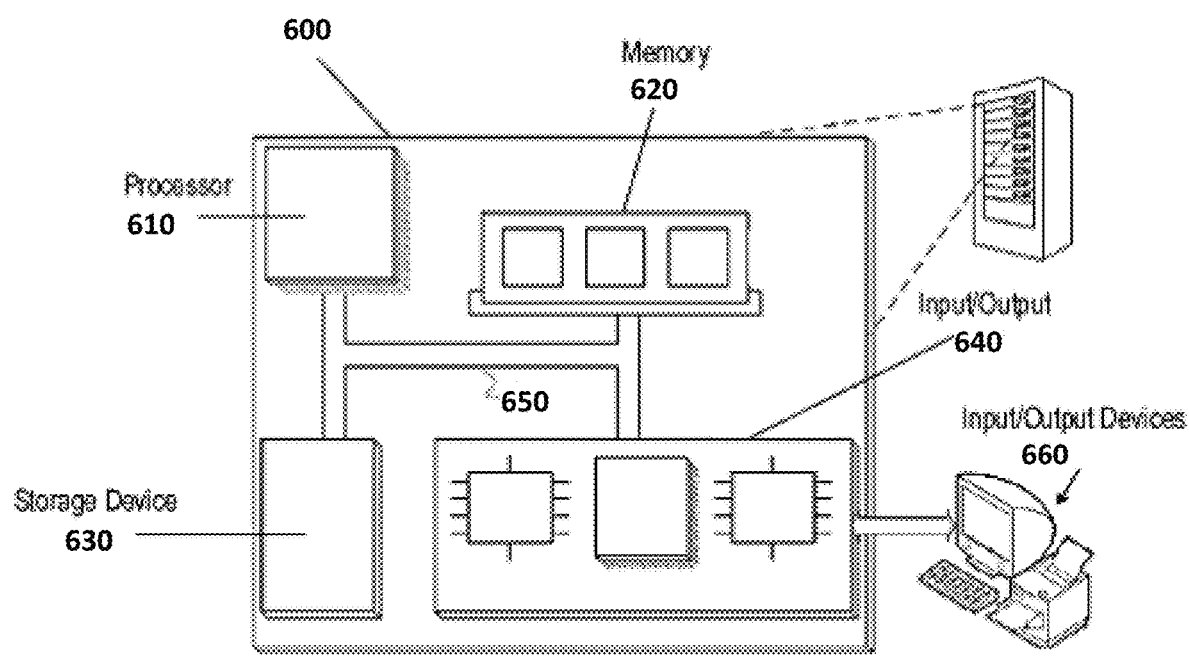
FIG. 6 is a block diagram of an example computer system that may be used in implementing the methods and systems described herein.

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, such as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and generally interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method comprising:
providing an extension for a web browser, the extension having a user interface configured to occupy a first portion of a user interface associated with the web browser;
collecting information on user behaviors related to usage patterns of the extension;
analyzing the information by user types, similar user companies, similar user company size, and similar user industry to determine the usage patterns of the extension;
based on the usage patterns, applying user-specific settings to the extension;
determining a user pattern associated with interaction on the web browser;
intercepting content fetched by the web browser for a web page, the web page being a company page, a social media page, or a professional page;
analyzing the user pattern and the fetched content for the web page to extract information comprising: (i) a company name, (ii) a candidate name, (iii) a job title, and (iv) an industry name;
querying a database for contextual information based on the extracted information, the contextual information being a summary of information obtained from one or more sources other than the web page;
presenting, via the user interface of the extension, the contextual information comprising:
(a) company information based on the company name,
(b) candidate information based on the candidate name,
(c) job title information based on the job title, and
(d) industry information based on the industry name;
upon detecting browsing of the web page by a user of the web browser, changing an appearance of the user interface of the extension to occupy a second portion of the user interface associated with the web browser; and
subsequent to detecting the browsing of the web page and changing the appearance of the user interface of the extension based on the user pattern, upon detecting that the user has selected the user interface of the extension, changing a size of the user interface of the extension to occupy a third portion of the user interface associated with the web browser, wherein the third portion occupies more display area than the first portion.

2. The method of claim 1, further comprising: prior to the query being received by the database, generating and storing the summary of information obtained from one or more sources other than the web page in the database.

3. The method of claim 2, wherein the one or more sources other than the web page comprise: (i) another web page, (ii) an application, and/or (iii) a predictive model.

4. The method of claim 1, wherein the first portion of the user interface occupied by the extension overlaps with a portion of the user interface of the web browser occupied by the web page.

5. The method of claim 1, wherein the first portion of the user interface occupied by the extension is adjacent with a portion of the user interface of the web browser occupied by the web page.

6. The method of claim 1, wherein the first portion is smaller than the second portion.

7. The method of claim 1, wherein the first portion overlaps the second portion.

8. The method of claim 1, wherein the candidate name is extracted from the fetched content, the method further comprising: presenting, via the user interface of the extension, a measure of affinity between a company associated with the candidate name and a company associated with a user of the web browser.

9. The method of claim 8, further comprising: receiving a predictive signal indicating the measure of affinity between the company associated with the candidate name and the company associated with the user of the web browser.

10. The method of claim 1, wherein the company name is extracted from the fetched content, the method further comprising: presenting, via the user interface of the extension, a measure of affinity between a company associated with the company name and a company associated with a user of the web browser.

11. The method of claim 1, wherein the candidate name is extracted from the fetched content, the method further comprising: presenting, via the user interface of the extension, a predictive score indicating a likelihood of an employment transition by a candidate having the candidate name.

12. The method of claim 11, further comprising: receiving a predictive signal indicating the likelihood of the employment transition by the candidate having the candidate name.

13. The method of claim 1, wherein the candidate name is extracted from the fetched content, the method further comprising: presenting, via the user interface of the extension, data indicating an extent to which a candidate having the candidate name is a statistical outlier among similar candidates.

14. The method of claim 13, further comprising: receiving a predictive signal indicating the extent to which the candidate having the candidate name is the statistical outlier among similar candidates.

15. The method of claim 1, further comprising: detecting, by the web-extension, whether the intercepted content is associated with a social media page, a professional page, and/or a company page.

16. The method of claim 15, wherein the web-extension detects that the intercepted content is a professional page, the method further comprising: identifying, by the web-extension a company name and/or an industry name included in the professional page; and presenting, by the web-extension, company information based on the company name and/or industry information based on the industry name.

17. The method of claim 1, further comprising: detecting, by the web-extension, data associated with a user viewing the web page, wherein the data includes a company name associated with the user and/or an industry name associated with the user; and presenting, via the user interface of the web-extension, company information related to the company name associated with the user and/or industry information related to the industry name associated with the user.

18. The method of claim 1, wherein the company name is extracted from the fetched content, the method further comprising: identifying, based on one or more criteria, a plurality of second companies similar to a first company associated with the company name; and presenting, via the user interface of the extension, names of one or more of the second companies similar to the first company.

19. The method of claim 18, further comprising: receiving predictive signals indicating respective measures of affinity between the plurality of second companies and the first company, wherein the names of the one or more second companies presented via the user interface extension are selected based on the measures of affinity between the one or more second companies and the first company.

20. The method of claim 1, wherein the company information relates to a particular company and comprises at least one of symbol of the particular company, a description of the particular company, news associated with the particular company, one or more ratings of the particular company, a predictive signal indicating a likelihood of an employment transition by one or more candidates from the particular company, a company match indicator indicating a match between the particular company and another company, one or more highlights relating to the particular company, or one or more companies similar to the particular company.

21. The method of claim 20, further comprising identifying the one or more companies similar to the particular company based on one or more characteristics satisfying one or more thresholds, wherein the one or more thresholds are user-configurable.

22. A non-transitory computer readable medium comprising instructions that, when executed by a processor, cause the processor to perform operations including:
 providing an extension for a web browser, the extension having a user interface configured to occupy a first portion of a user interface associated with the web browser;
 collecting information on user behaviors related to usage patterns of the extension;
 analyzing the information by user types, similar user companies, similar user company size, and similar user industry to determine the usage patterns of the extension;
 based on the usage patterns, applying user-specific settings to the extension;
 determine a user pattern associated with interaction on the web browser;
 intercepting content fetched by the web browser for a web page, the web page being a company page, a social media page, or a professional page;
 analyzing the user pattern and the fetched content for the web page to extract information comprising: (i) a company name, (ii) a candidate name, (iii) a job title, and (iv) an industry name;
 querying a database for contextual information based on the extracted information, the contextual information being a summary of information obtained from one or more sources other than the web page;
 presenting, via the user interface of the extension, the contextual information comprising:
 (a) company information based on the company name,
 (b) candidate information based on the candidate name,
 (c) job title information based on the job title, and
 (d) industry information based on the industry name;
 upon detecting browsing of the web page by a user of the web browser, changing an appearance of the user interface of the extension to occupy a second portion of the user interface associated with the web browser; and
 subsequent to detecting the browsing of the web page and changing the appearance of the user interface of the extension based on the user pattern, upon detecting that the user has selected the user interface of the extension, changing a size of the user interface of the extension to occupy a third portion of the user interface associated with the web browser, wherein the third portion occupies more display area than the first portion.

23. A system comprising:
 at least one memory device storing computer-readable instructions; and
 at least one processor operable to execute the computer-readable instructions to perform operations including:
 providing an extension for a web browser, the extension having a user interface configured to occupy a first portion of a user interface associated with the web browser;
 collecting information on user behaviors related to usage patterns of the extension;

analyzing the information by user types, similar user companies, similar user company size, and similar user industry to determine the usage patterns of the extension;

based on the usage patterns, applying user-specific settings to the extension;

determine a user pattern associated with interaction on the web browser;

intercepting content fetched by the web browser for a web page, the web page being a company page, a social media page, or a professional page;

analyzing the user pattern and the fetched content for the web page to extract information comprising: (i) a company name, (ii) a candidate name, (iii) a job title, and (iv) an industry name;

querying a database for contextual information based on the extracted information, the contextual information being a summary of information obtained from one or more sources other than the web page;

presenting, via the user interface of the extension, the contextual information comprising: (a) company information based on the company name, (b) candidate information based on the candidate name, (c) job title information based on the job title, and (d) industry information based on the industry name;

upon detecting browsing of the web page by a user of the web browser, changing an appearance of the user interface of the extension to occupy a second portion of the user interface associated with the web browser; and subsequent to detecting the browsing of the web page and changing the appearance of the user interface of the extension based on the user pattern, upon detecting that the user has selected the user interface of the extension, changing a size of the user interface of the extension to occupy a third portion of the user interface associated with the web browser, wherein the third portion occupies more display area than the first portion.

* * * * *